United States Patent
Kilshaw

(10) Patent No.: US 7,361,109 B2
(45) Date of Patent: Apr. 22, 2008

(54) BICYCLE GEAR SET

(76) Inventor: Richard J. Kilshaw, 4332 Harvey Way, Lake Oswego, OR (US) 97035

( * ) Notice: Subject to any disclaimer, the term of this patent is extended or adjusted under 35 U.S.C. 154(b) by 0 days.

(21) Appl. No.: 10/908,881

(22) Filed: May 31, 2005

(65) Prior Publication Data

US 2006/0270499 A1 Nov. 30, 2006

(51) Int. Cl.
F16H 63/00 (2006.01)
B62M 1/00 (2006.01)

(52) U.S. Cl. ............... 474/81; 474/80; 474/79; 280/261

(58) Field of Classification Search ............... 474/78, 474/80, 81, 79, 148; 180/261; 261/260, 261/261
See application file for complete search history.

(56) References Cited

U.S. PATENT DOCUMENTS

| | | | | |
|---|---|---|---|---|
| 1,374,109 | A * | 4/1921 | Pierle | 474/81 |
| 3,906,809 | A | 9/1975 | Erickson | 74/217 S |
| 4,340,377 | A | 7/1982 | Johnson et al. | 474/81 |
| 5,033,991 | A | 7/1991 | McLaren | 474/78 |
| 5,611,556 | A * | 3/1997 | Davidow | 280/236 |
| 6,247,555 | B1 * | 6/2001 | Millard | 184/15.1 |
| 6,948,730 | B2 | 9/2005 | Morita et al. | 280/260 |
| 2004/0014543 | A1 * | 1/2004 | Van Der Linde | 474/160 |
| 2004/0066017 | A1 * | 4/2004 | Dratewski | 280/260 |
| 2004/0067804 | A1 * | 4/2004 | Dratewski | 474/78 |
| 2004/0106482 | A1 * | 6/2004 | Nagano | 474/82 |
| 2004/0130120 | A1 * | 7/2004 | Matsumoto et al. | 280/260 |
| 2004/0214670 | A1 * | 10/2004 | Matsumoto et al. | 474/78 |
| 2005/0172756 | A1 | 8/2005 | Matsumoto et al. | 74/606 |
| 2005/0173890 | A1 | 8/2005 | Matsumoto et al. | 280/261 |
| 2005/0215367 | A1 * | 9/2005 | Thomasberg | 474/78 |
| 2006/0058131 | A1 * | 3/2006 | Cooke | 474/78 |

FOREIGN PATENT DOCUMENTS

DE 3908385 C1 * 6/1990

* cited by examiner

Primary Examiner—Richard Ridley
Assistant Examiner—Terence Boes
(74) Attorney, Agent, or Firm—Timothy E. Siegel

(57) ABSTRACT

A bicycle gear assembly has first and second sets of cog wheels, each having at least three cog wheels of various sizes including a largest cog wheel and a smallest cog wheel. These two sets are oriented so that the largest cog wheel of the first set is aligned with the smallest cog wheel of the second set and the smallest cog wheel of the first set is aligned with the largest cog wheel of the second set, the first and the second sets of cog wheels define at least a first, second and third pair of substantially aligned cog wheels. Additionally, a chain is mounted about a first pair of the aligned cog wheels and a gear shift assembly is adapted to move the chain from the first pair of cogwheels to the second pair of cogwheels and from the second pair of cogwheels to the third pair of cogwheels.

20 Claims, 4 Drawing Sheets

BICYCLE GEAR SET

BACKGROUND OF THE INVENTION

Since the advent of mountain biking, there has been a perceived need for a bicycle gearing system that both is resistant to being derailed by debris that is accidentally kicked up into the gear set by a bicycle rider and yet offers a wide range of gearing. Toward this goal gearing systems have appeared in the literature, in which the gears are encased in a protective housing.

In these new systems a drive wheel may be co-journalled with a driven set of gears and, in turn, drive a cog wheel on the bicycle's rear wheel. Unfortunately, these systems do not have as wide a range of gearing options as some mountain biking enthusiasts might desire. Moreover, the inner workings of some gear box designs are fairly complicated, resulting in a gear box that is heavier and more prone to larger frictional losses and rapid wear than is desirable.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention is a bicycle gear assembly that comprises first and second sets of at least three co-journalled cog wheels, each having co-journalled cog wheels of various sizes including a largest cog wheel and a smallest cog wheel. These two sets are oriented so that the largest cog wheel of the first set is substantially aligned with the smallest cog wheel of the second set and vice versa. Accordingly, the first and the second sets of cogwheels define at least a first, second and third pair of substantially aligned cog wheels. Additionally, a chain is mounted about a first pair of the aligned cog wheels and a gear shift assembly is adapted to move the chain from the first pair of substantially aligned cog wheels to the second pair of substantially aligned cog wheels and from the second pair of substantially aligned cog wheels to the third pair of substantially aligned cog wheels.

In a second separate aspect, the present invention is a bicycle that includes a gear assembly that has first and second sets of co-journalled cog wheels, each having at least three cog wheels of various sizes including a largest cog wheel and a smallest cog wheel, oriented so that the largest cog wheel of the first set is aligned with the smallest cog wheel of the second set and vice versa. Accordingly, the first and the second sets of cog wheels define at least a first, second and third pair of substantially aligned cog wheels. Additionally, a chain is mounted about a first pair of aligned cog wheels and a gear shift assembly is adapted to move the chain from the first pair of substantially aligned cogwheels to the second pair of substantially aligned cog wheels and from the second pair of substantially aligned cog wheels to the third pair of substantially aligned cog wheels.

In a third separate aspect, the present invention is a gear assembly, comprising a co-journalled set of drive cog wheels and a co-journalled set of driven cog wheels. Also, a circular chain links a drive cog wheel to a driven cog wheel. Finally, a chain tensioning assembly includes a polymeric roller that defines a channel on its outer rim and is rotationally mounted on a tensioned arm that pushes this polymeric roller into the chain. This assembly is positioned so that the chain resides in the roller rim channel.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 4 is a detail sectional side view, taken along line 4-4 of FIG. 2.

FIG. 5 is a detail sectional side view, taken along line 5-5 of FIG. 2.

DETAILED DESCRIPTION OF THE PREFERRED EMBODIMENT(S)

Figure 1:
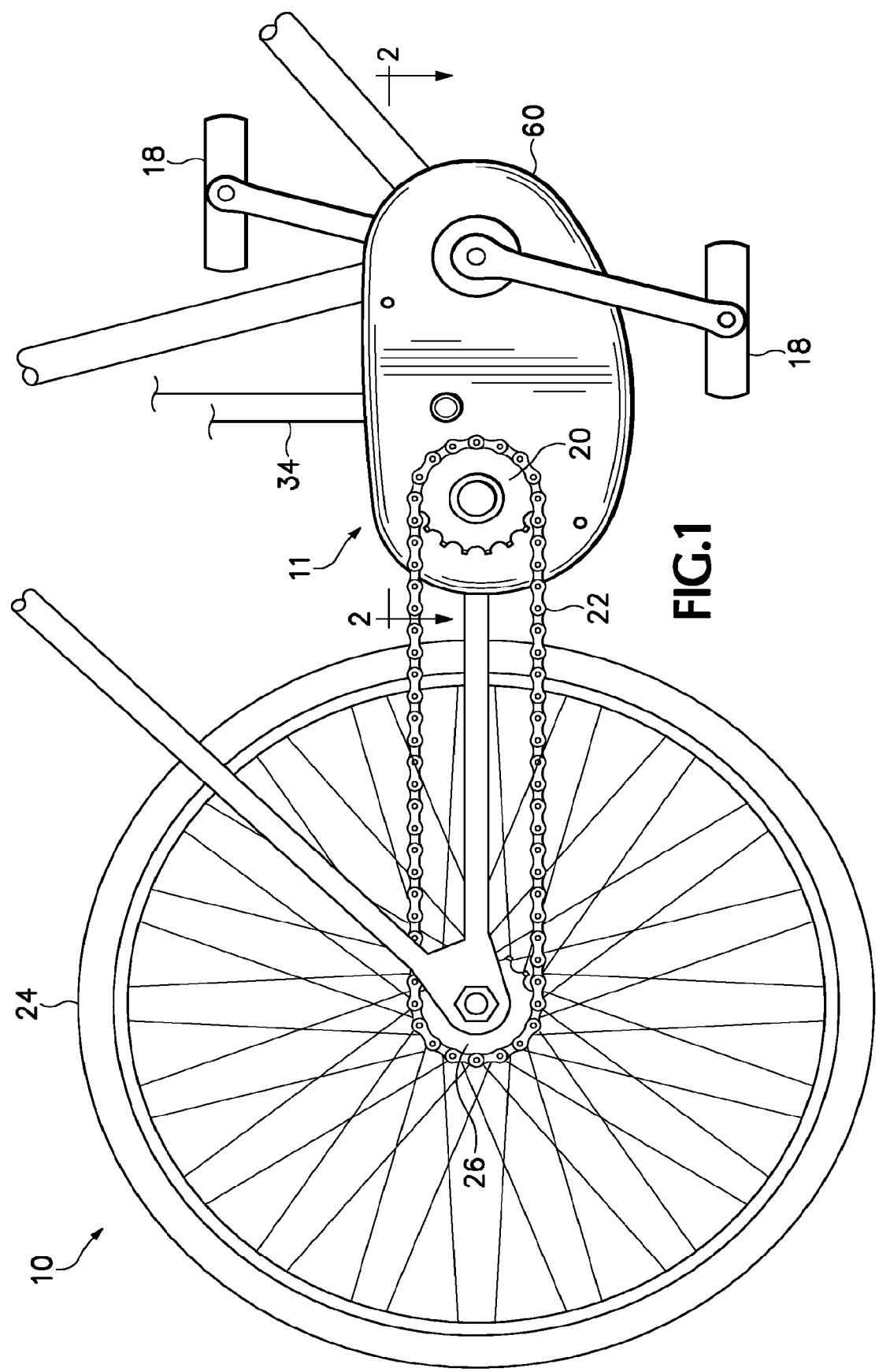
FIG. 1 is a partial side view of a bicycle, including a gear box as in the present invention.
Figure 2:
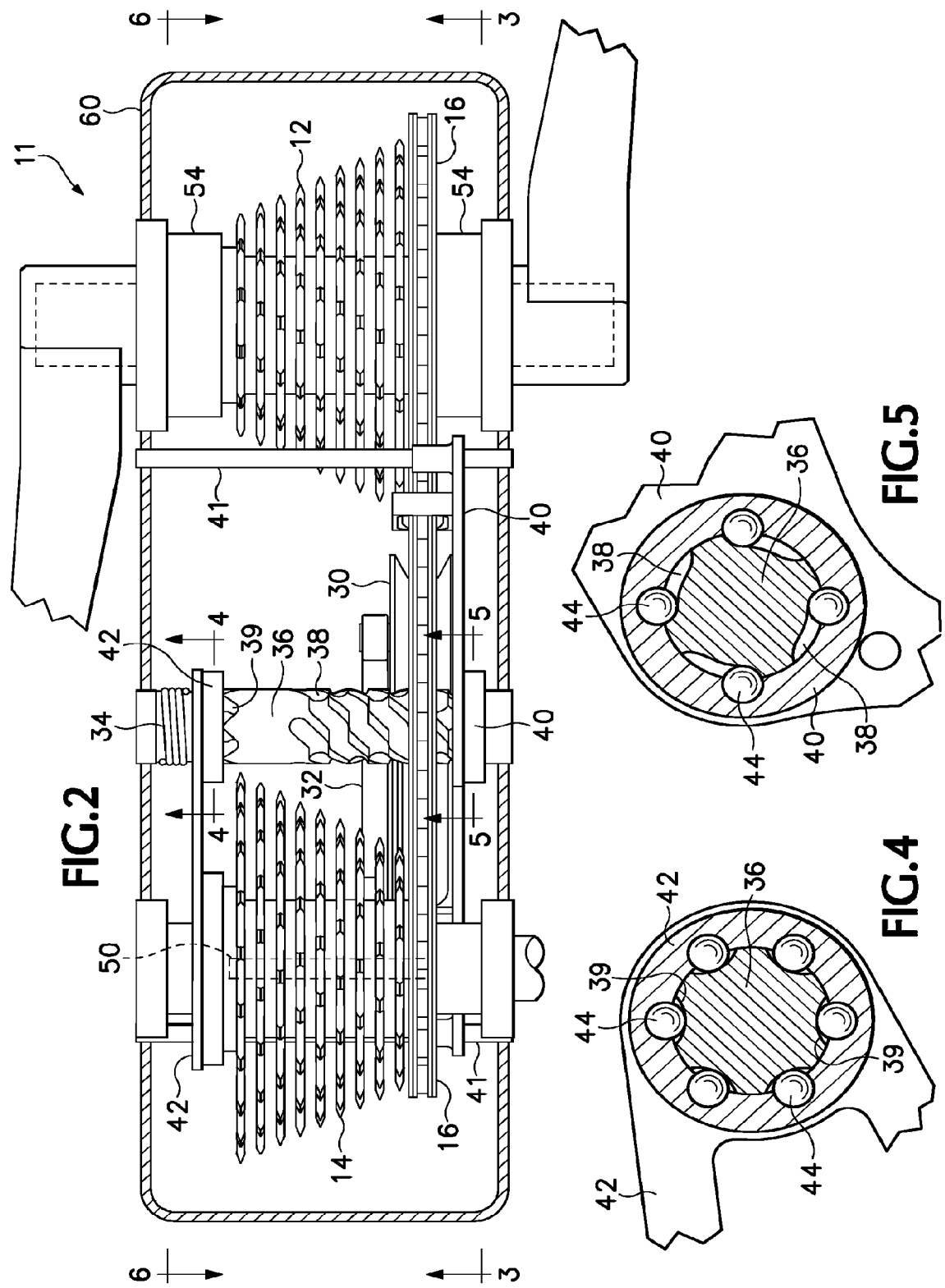
FIG. 2 is a downwardly looking sectional view taken along lines 2-2 of FIG. 1.

Referring to FIG. 1, a bicycle 10 includes a preferred embodiment of a bicycle gear assembly 11. Turning to FIG. 2, assembly 11 includes a co-journalled drive cog wheel set 12, a co-journalled driven cog wheel set 14 and a chain 16 linking a cog wheel on set 12 with a cog wheel on set 14. Drive set 12 is driven by a pair of pedals 18 (FIG. 1) and driven set 14 is driven by way of chain 16, from set 12. Referring again to FIG. 1, the driven set 14, is co-journalled to a stand alone drive cog wheel 20 that powers a chain 22 that, in turn, powers a bicycle rear wheel 24 by way of a rear wheel cog wheel 26.

A tension roller 30, preferably made of durable polymer and having an outer rim that defines a channel or groove for accepting the chain 16, is mounted on a roller arm 32 that is spring loaded to press roller 30 inwardly into chain 16. This causes a greater engagement of chain 16 with the teeth of the cog wheels about which it is mounted. The more teeth are engaged with chain 16, the more force may be transmitted from cog wheel set 12 to set 14. Also, the tension roller 30 serves the purpose of taking up the extra chain length that is necessary to allow the chain to successfully transit from one cog wheel to the next cog wheel and that accommodates the small changes in chain slack as the gears are changed in steps, as described below.

Referring to FIGS. 2, 4 and 5, to effect a shifting of gears, a cable 34 is pulled so that it rotates a guide bar 36. A set of chain shift channels 38 and a driven cog set shift channel 39, move a chain shift guide bar follower 40 and driven cog set shift guide bar follower 42, which move the chain 16 and the driven cog wheel set 14 respectively in response to the rotation of guide bar 36. A pair of slide rods 41 prevent follower 40 from rotating about guide bar 36. Skilled persons will recognize that a bearing/coupling must be used to join follower 42 and the largest of cog wheels 14 so that as follower 42 operatively presses against this cog wheel 14 it does not impede its rotation by way of frictional resistance. The bearing/coupling also makes it possible for follower 42 to move cog wheel set 14 by pulling on it transversely. Bearing/coupling devices are well known in the art.

Figure 6:
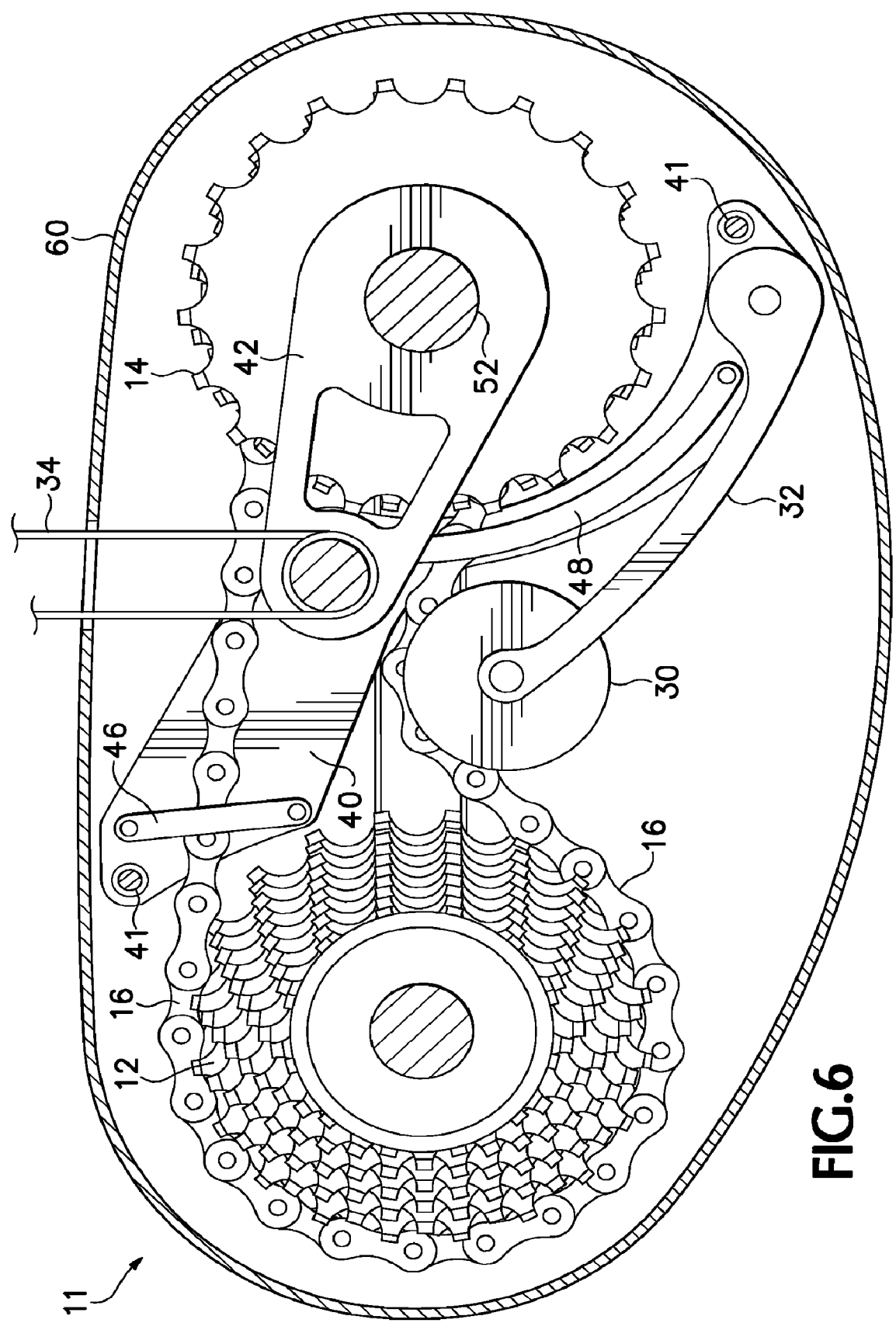
FIG. 6 is a sectional side view, taken along line 6-6 of FIG. 2.

To facilitate their movement, a pair of ball bearing sets 44 are mounted in followers 40 and 42 and set into guide bar channels 38 and 39, respectively, to facilitate movement of followers 40 and 42. The chain shift guide bar follower 40 includes an upper chain cage 46 (FIG. 6) and a lower chain cage 48 (FIG. 6). Cage 46 surrounds the upper (loaded) run of chain 16 whereas cage 48 surrounds the lower (non-loaded) run of chain 16. Cages 46 and 48 provide the sideways loading on the chain 16 necessary to force gear changes on both cog gear sets.

Figure 3:
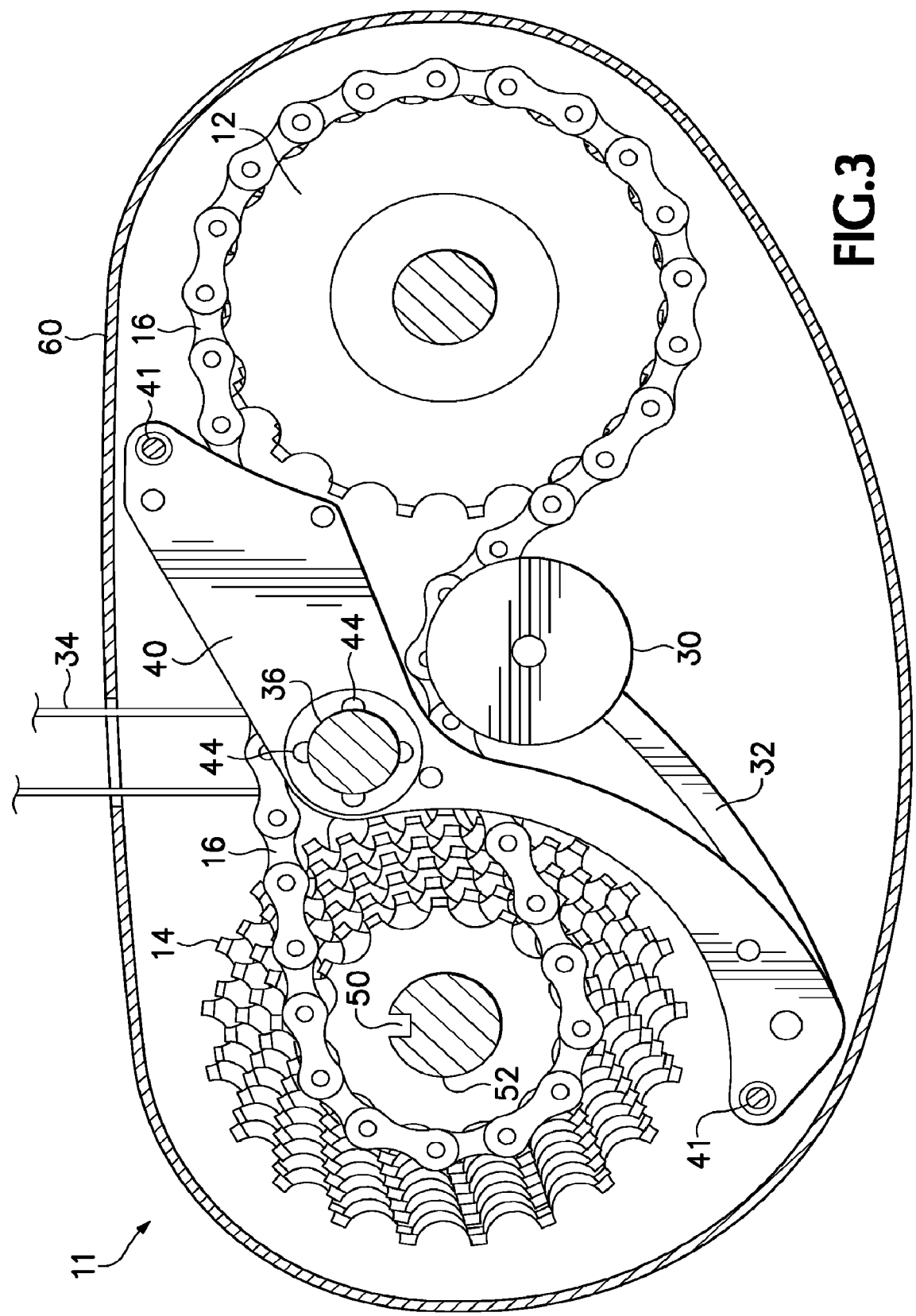
FIG. 3 is a sectional side view taken along line 3-3 of FIG. 2.

Facing in the direction of FIG. 3, a counterclockwise rotation of guide bar 36, causes the chain 16 to be moved into the paper. As the gear set 11 is shifted from the highest gearing, which is shown in FIGS. 2, 3 and 6, to the lowest gearing (not shown), chain 16 is shifted in alternating step types. In a first step type the chain is shifted from a smaller driven cog wheel 14 to a larger driven cog wheel 14, whereas in a second step type the chain is shifted from a larger drive cog wheel 12 to a smaller drive cog wheel 12.

In greater detail in the first step type, as dictated by driven set channel 39, the driven cog wheel set 14, following the back and forth pattern of channel 39 moves in the "out of the paper" (of FIG. 3) direction while chain 16 is kept stationary in the transverse dimension as guide bar channels 38 are straight in this interval. As noted previously, in this first step type chain 16 moves from a smaller driven cog wheel 14 to a larger driven cog wheel 14. In the second step type, the driven wheel set 14, now reversed in direction due to the back and forth pattern of channel 39, is moved in tandem with the chain shift guide bar follower 40 and chain 16. This is because the portions of the chain shift channels 38 and the driven set channel 39 that run in the same helical pattern are now being used to move followers 40 and 42, respectively. As a result, upper cage 46 pushes the chain 16 to move from a larger drive cog wheel 12 to a smaller drive cog wheel 12. By repeating the first step and the second step type the chain 16 can be moved in steps and may be changed from the two highest gearing cog wheels of sets 12 and 14 to the two lowest gearing cog wheels of sets 12 and 14. The reverse process takes place when shifting from lowest gear to highest gear.

A spline 50 permits cog wheel 14 to be moved transversely back and forth and yet drive an axle 52, which is journalled to and drives drive cog wheel 20 (FIG. 1). A one way clutch 54 permits the rotation of drive cog wheel set 12 while the pedals 18 are stationary. A sturdy housing 60 of metal (steel or aluminum, for example) or a robust polymer protects gear box 11 from an intrusion of debris.

Skilled persons will appreciate that although cog wheel sets 12 and 14 are shown as being identical but rotated 180 degrees relative to each other, these sets need not be identical. In one preferred embodiment, each substantially aligned pair of cog wheels (one cogwheel from set 12 and the other from set 14) collectively has the same number of teeth as all the other substantially aligned cog wheel pairs. Although in other preferred embodiments this is not the case, there is an advantage for the case in which each aligned cog wheel pair collectively has a number of teeth that is not very different from the other, similar, aligned cog wheel pairs. The advantage is that a single tension roller 30, which provides more chain wrap on both cogs, is possible since in this embodiment the change in chain slack over the gearing range is small.

While a number of exemplary aspects and embodiments have been discussed above, those skilled in the art will recognize that it would be possible to make certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A bicycle gear assembly, comprising:
   (a) first and second sets of co-journalled cog wheels, each having at least three cog wheels of various sizes including a largest cog wheel and a smallest cog wheel, oriented so that said largest cog wheel of said first set is aligned with said smallest cog wheel of said second set, thereby forming a first pair of cog wheels, and a cog wheel adjacent to said largest cog wheel of said first set being aligned with a cog wheel adjacent to said smallest cog wheel of said second set, thereby forming a second pair of cog wheels;
   (b) a chain mounted about one of said pairs of cog wheels;
   (c) a gear changing assembly adapted to move said chain from said first pair of cog wheels to said second pair of cog wheels;
   (d) wherein said gear changing assembly moves said chain from said first pair of cogwheels to said second pair of cogwheels by first moving said chain to a first cog wheel of said second pair of cogwheels and then moving said chain to a second cog wheel of said second pair of cog wheels; and
   (e) wherein said cog wheel sets are moved relative to one another so that when said chain is mounted on said first cog wheel of said second pair of cog wheels and is also mounted on said second cog wheel of said first pair of cog wheels, said two cog wheels upon which said chain is mounted are aligned.

2. The gear assembly of claim 1 further comprising a housing protecting said chain and said cog wheels.

3. The gear assembly of claim 1, said assembly being mounted on a bicycle and wherein a drive gear is co-journalled to said second gear set, said drive gear being fitted with a chain to drive a cog wheel co-journalled to a wheel of said bicycle.

4. The gear assembly of claim 1, wherein each of said sets of cog wheels is identical in size.

5. The gear assembly of claim 4, wherein each of said sets of cog wheels have cog wheels arranged linearly, in order of increasing size.

6. The gear assembly of claim 1, wherein said chain defines a closed form defining an outside region and an inside region and said gear changing assembly includes a chain tensioning roller located in said outside region, adapted to press against said chain pushing said chain toward said inside region, to place tension on said chain.

7. The gear assembly of claim 6, wherein said chain tensioning roller presses on said chain toward said inside region at a location between said cog wheel sets, thereby causing engagement of said chain with said cog wheels.

8. The gear assembly of claim 1, wherein each said cog wheel set defines an adjacent cog wheel pair spacing and said relative movement of said cog wheel sets is limited to one adjacent cog wheel pair spacing.

9. The gear assembly of claim 1, wherein said gear changing assembly moves said chain from said first pair of cogwheels to said second pair of cogwheels by first moving said chain to a first cog wheel of said second pair of cogwheels and then moving said chain to a second cog wheel of said second pair of cog wheels and wherein when said chain is mounted on said first cog wheel of said second cog wheel pair, and is also mounted on said second cog wheel of said first cog wheel pair, said first cog wheel of said second cog wheel pair does not exert a transverse force on said chain sufficient to cause said chain to move to said second cog wheel of said second cog wheel pair.

10. The gear assembly of claim 1, wherein said first and said second cog wheel set define rotational axis, said rotational axis are spaced apart by a distance sufficient such that said gear changing assembly can exist there between.

11. The gear assembly of claim 1, wherein said gear changing assembly moves said chain from said first pair of aligned cog wheels to said second pair of aligned cog wheels by first moving said chain to a second cog of said first cog wheel set, then moving the chain to a second cog of said second cog wheel set, wherein said second cog wheel of said first cog wheel set does not exert a transverse force on said chain sufficient to cause said chain to move to said second cog wheel of said second cog wheel set.

12. A bicycle, comprising:
(a) a gear assembly, having:
(i) first, and second sets of co-journalled cog wheels, each having cog wheels of various sizes including a largest cog wheel and a smallest cog wheel, oriented so that said largest cog wheel of said first set is aligned with said smallest cog wheel of said second set, thereby forming a first pair of cog wheels, and a cog wheel adjacent to said largest cog wheel of said first set being aligned with a cog wheel adjacent to said smallest cog wheel of said second set, thereby forming a second pair of cog wheels;
(ii) a chain mounted about said first pair of cog wheels;
(iii) a gear changing assembly adapted to move said chain from said first pair of cogwheels to said second pair of cog wheels;
(iv) wherein said gear changing assembly moves said chain from said first pair of cogwheels to said second pair of cogwheels by first moving said chain to a first cog wheel of said second pair of cogwheels and then moving said chain to said second pair of cog wheels; and
(v) wherein said cog wheel sets are moved relative to one another to so that when said chain is mounted on said first cog wheel of said second pair of cog wheels and is also mounted on said second cog wheel of said first pair of cog wheels, said two cog wheels upon which said chain is mounted are aligned.

13. The bicycle of claim 12 wherein a drive gear is co-journalled to said second gear set, said drive gear being fitted with a chain to drive a cog wheel co-journalled to a wheel of said bicycle.

14. The bicycle of claim 11 wherein each of said sets of cog wheels is identical in size.

15. The bicycle of claim 11 wherein each of said sets of cog wheels have cog wheels arranged linearly, in order of increasing size.

16. The bicycle of claim 11 wherein said chain defines a closed form defining an outside region and an inside region and said gear changing assembly includes a spring loaded chain tensioning roller located in said outside region, adapted to press against said chain pushing said chain toward said inside region, to place tension on said chain.

17. The bicycle of claim 12, wherein each said cog wheel set defines an adjacent cog wheel pair spacing and said relative movement of said cog wheel sets is limited to one adjacent cog wheel pair spacing.

18. The bicycle of claim 12, wherein said first and said second cog wheel set define parallel rotational axis and a plane, passing through said parallel rotational axis, said plane defining a first side of plane and a second side of plane, said gear changing assembly further comprising an upper portion and a lower portion, said upper portion residing on said first side of plane and said lower portion residing on said second side of plane.

19. The bicycle of claim 12, wherein said gear changing assembly moves said chain from said first pair of cogwheels to said second pair of cogwheels by first moving said chain to a first cog wheel of said second pair of cogwheels and then moving said chain to said second pair of cog wheels and wherein when said chain is mounted on said first cog wheel of said second cog wheel pair, and is also mounted on said second cog wheel of said first cog wheel pair, said first cog wheel of said second cog wheel pair does not exert a transverse force on said chain sufficient to cause said chain to move to said second cog wheel of said second cog wheel set.

20. The bicycle of claim 12 further comprising a housing protecting said chain and said cog wheels.

* * * * *